Nov. 7, 1950　　　　S. RAPPAPORT ET AL　　　　2,528,912
SPOTTER MECHANISM
Filed May 2, 1949　　　　　　　　　　　　　　　8 Sheets-Sheet 8
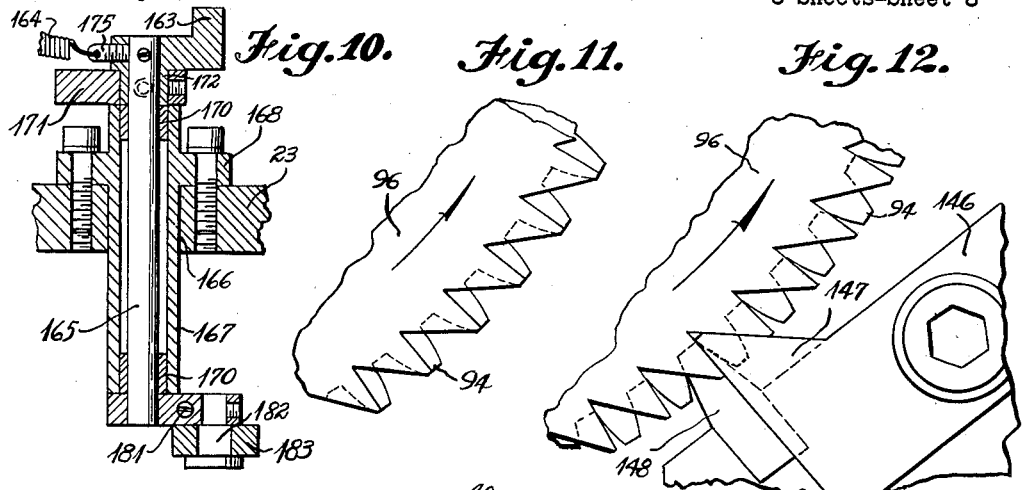
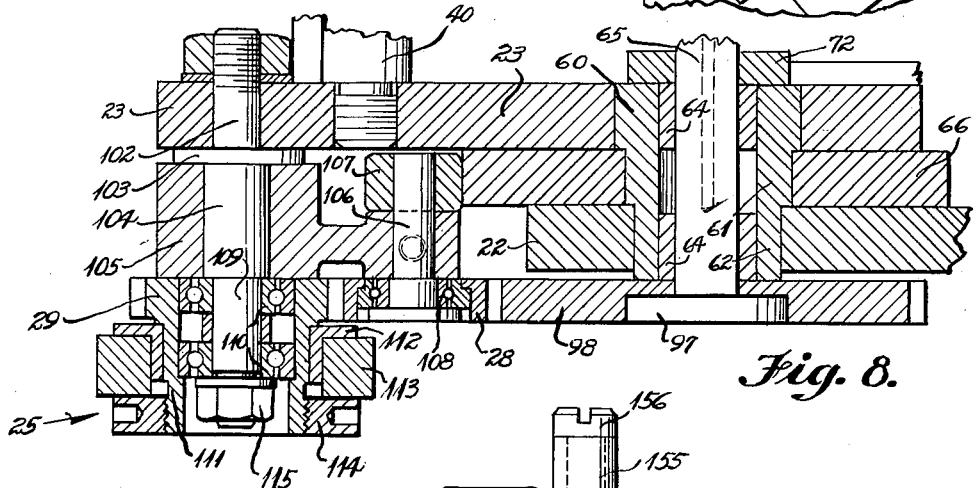
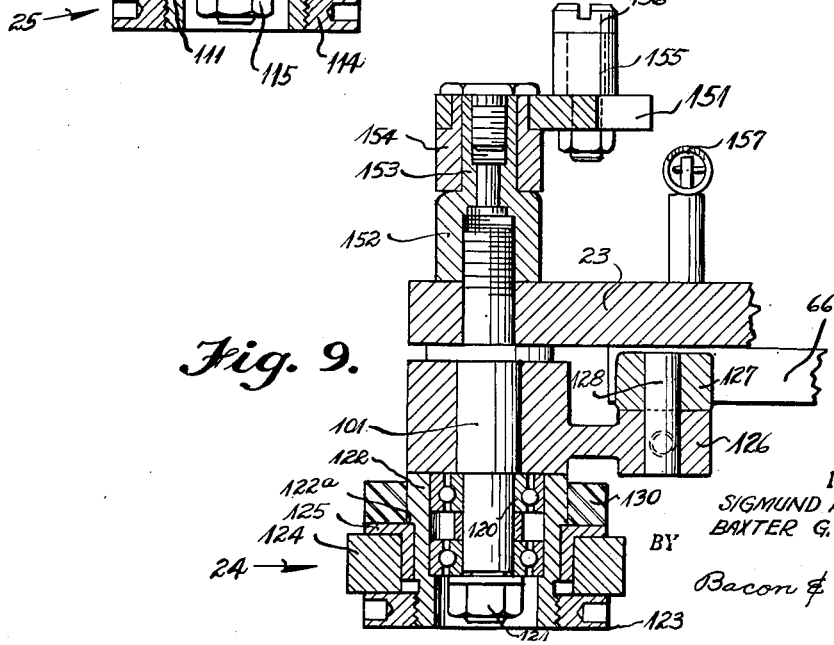
INVENTORS
SIGMUND RAPPAPORT AND
BAXTER G. PROCTOR, JR.
BY
Bacon & Thomas
ATTORNEYS Patented Nov. 7, 1950

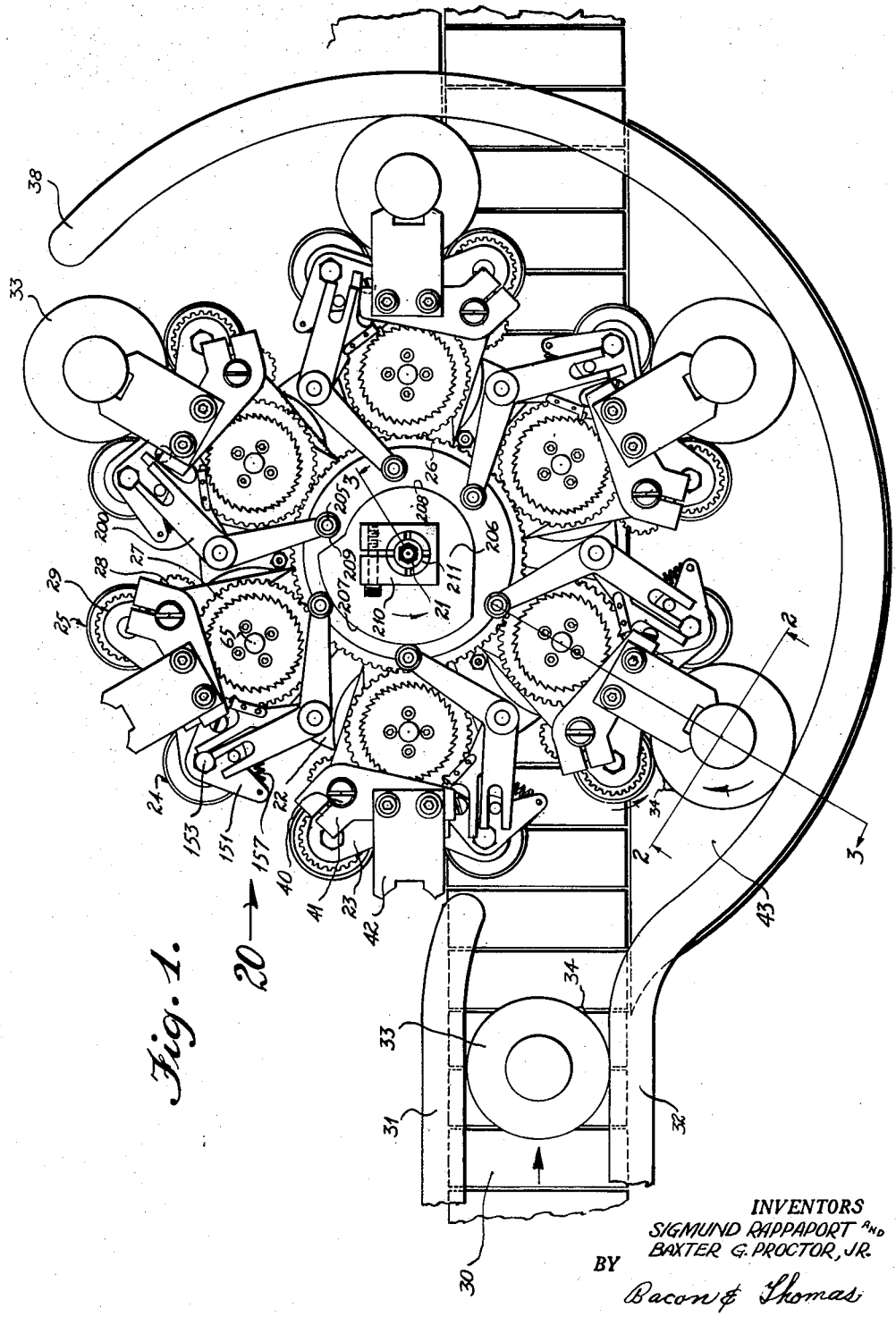

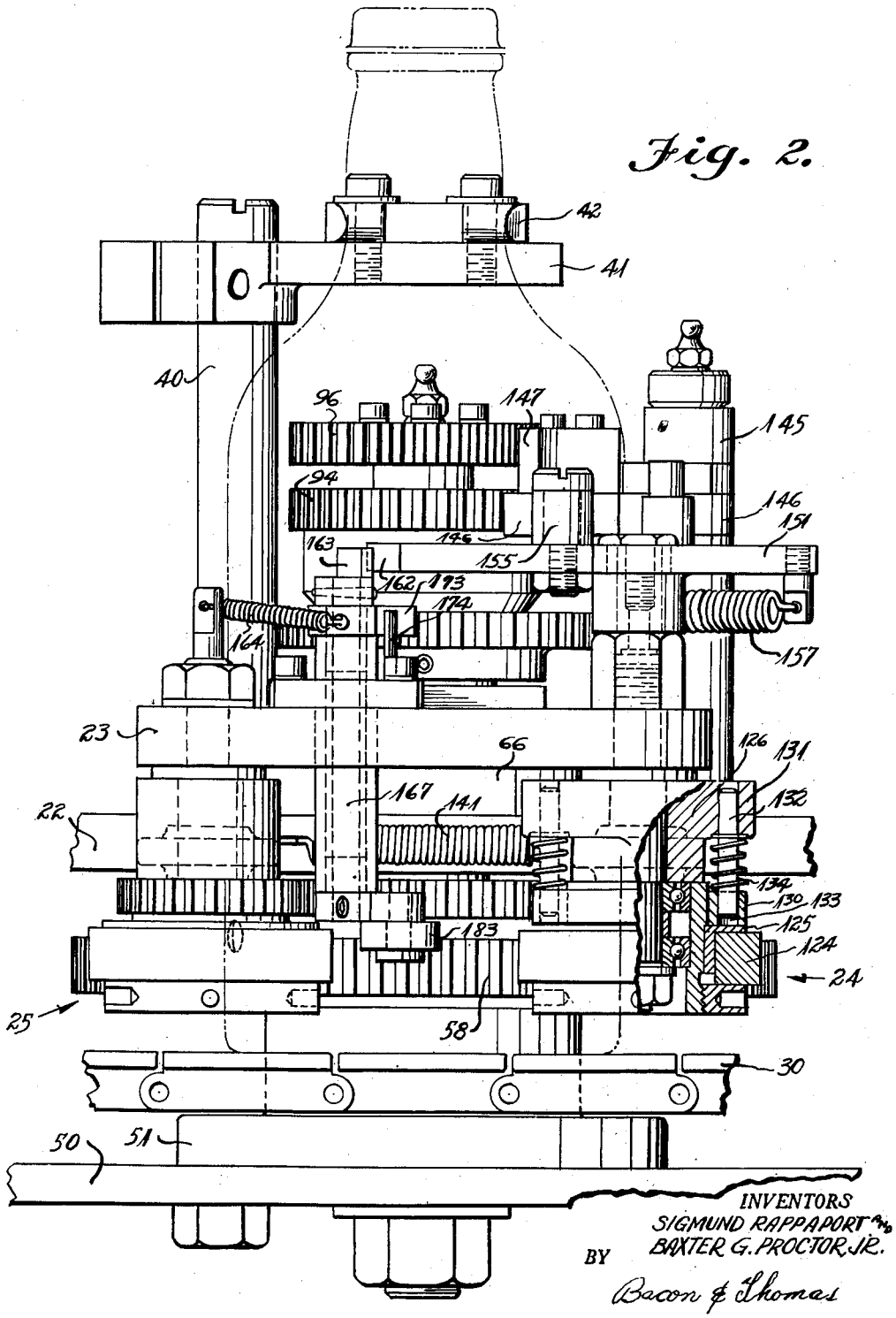

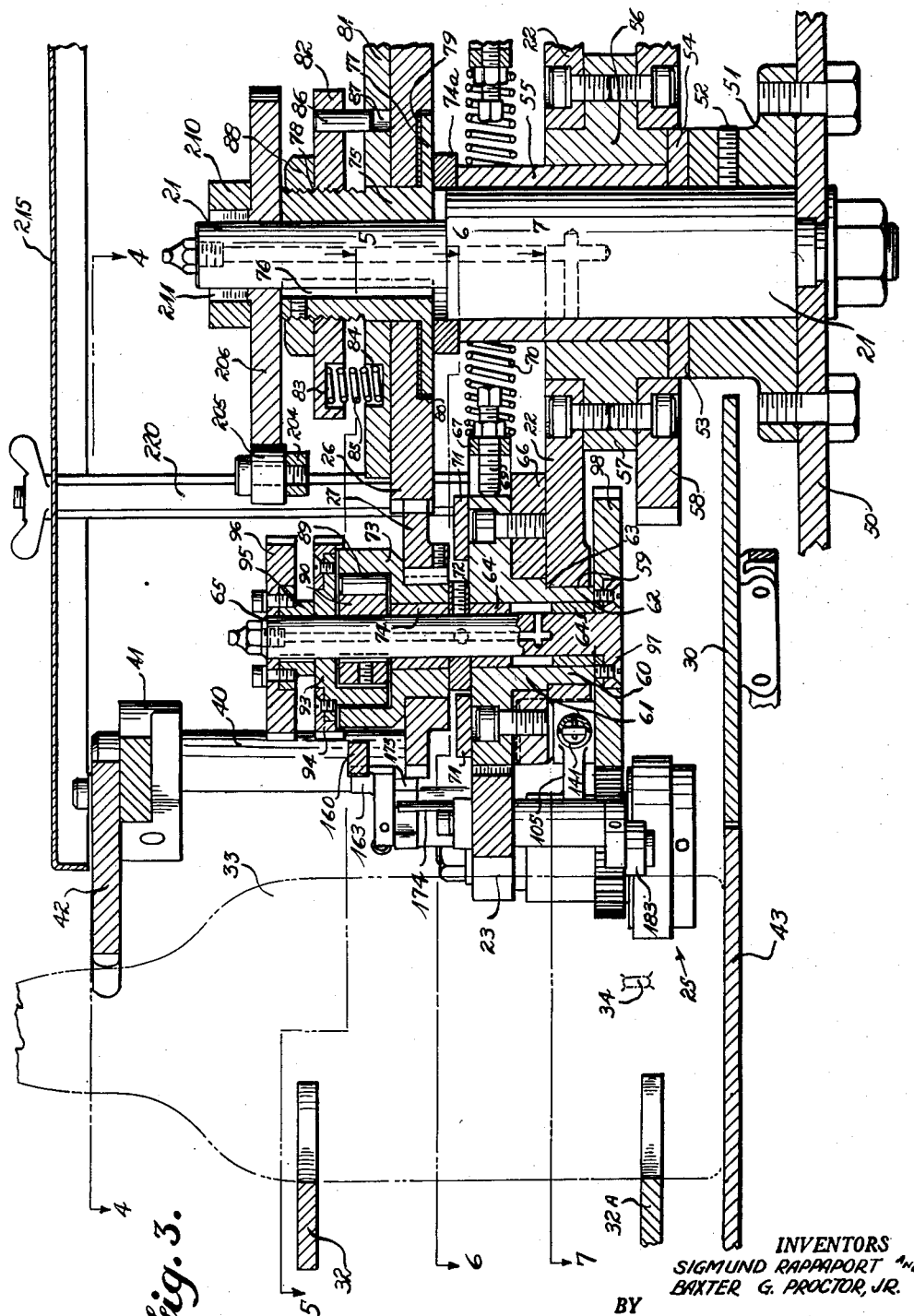

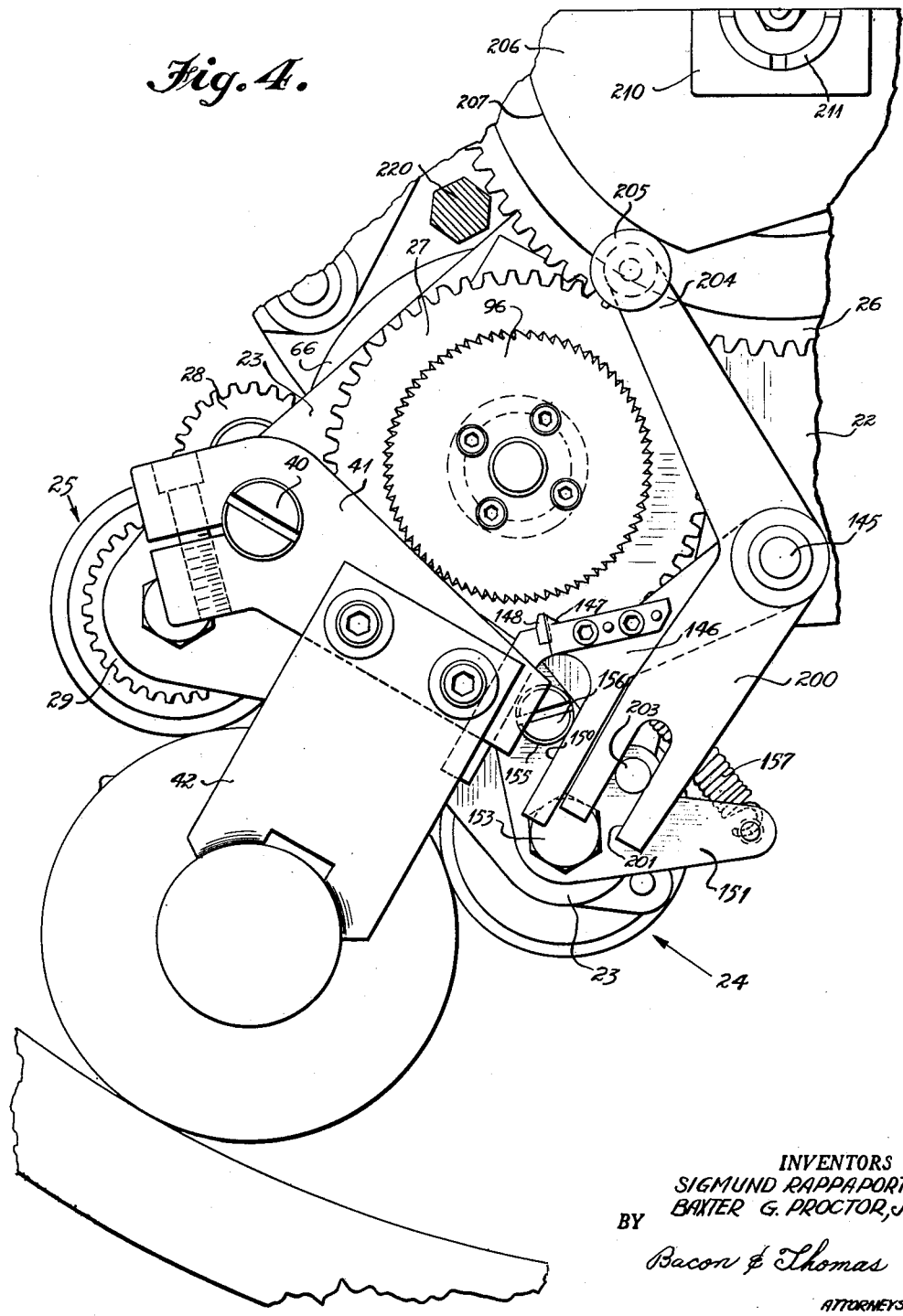

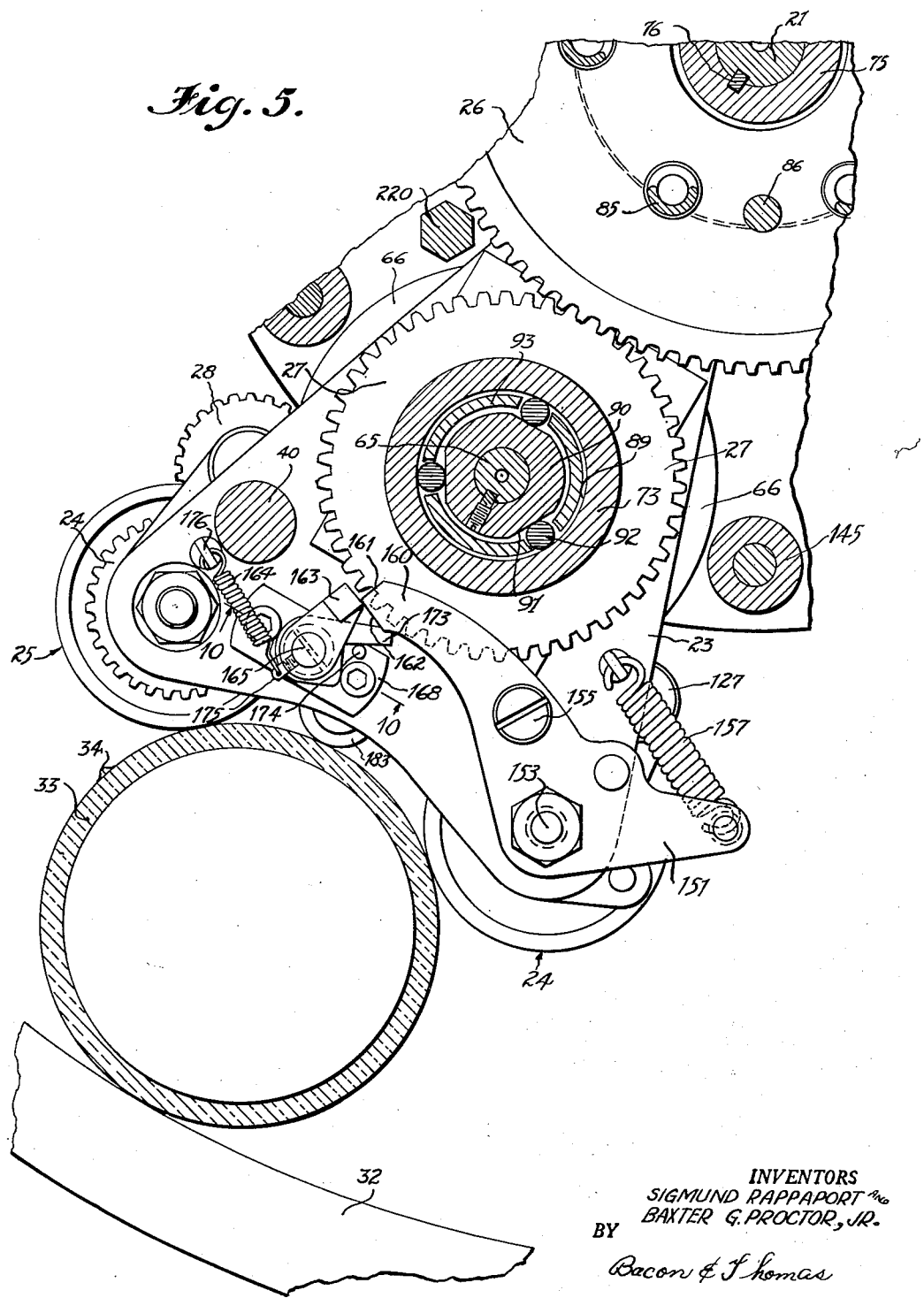

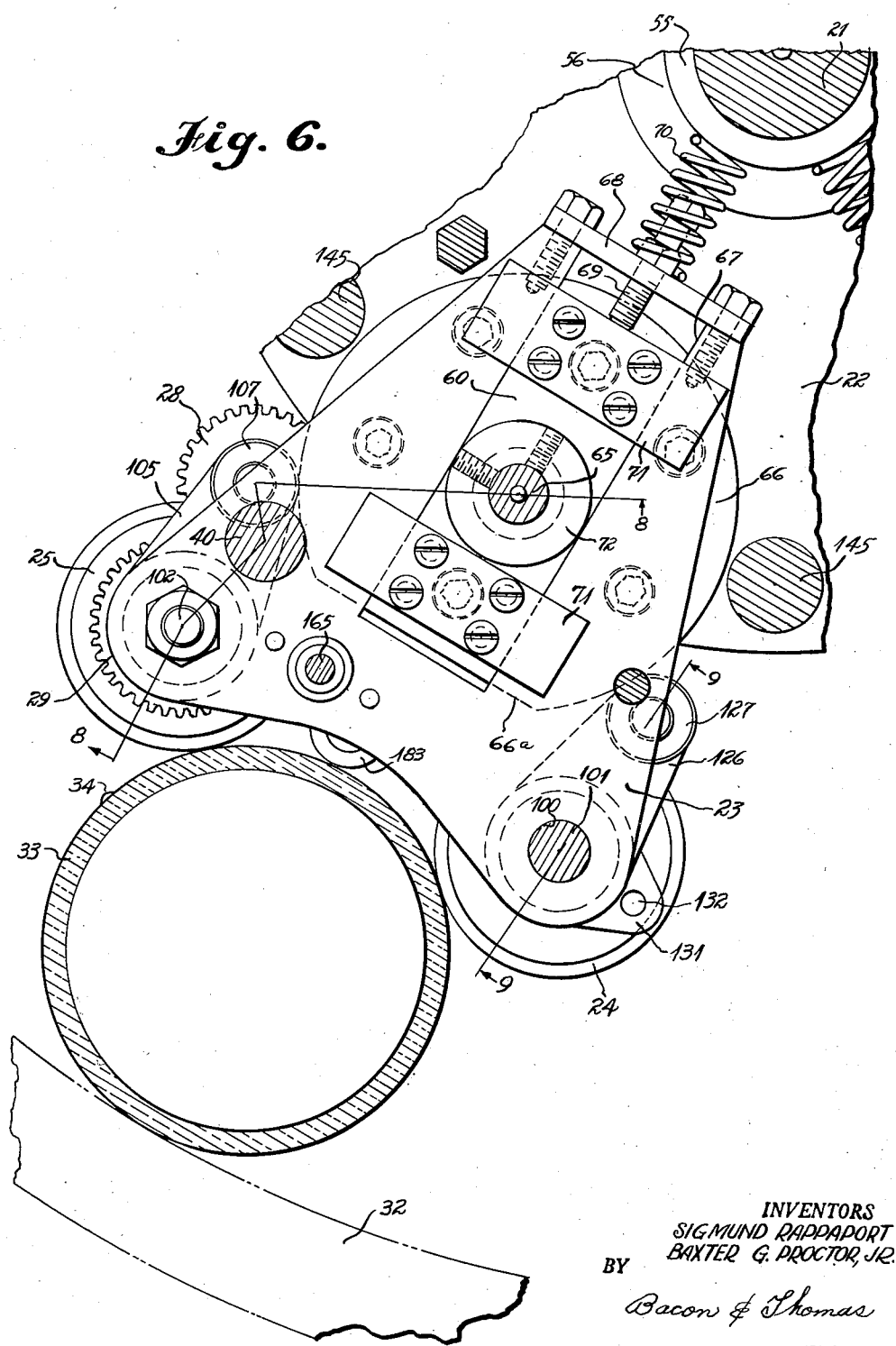

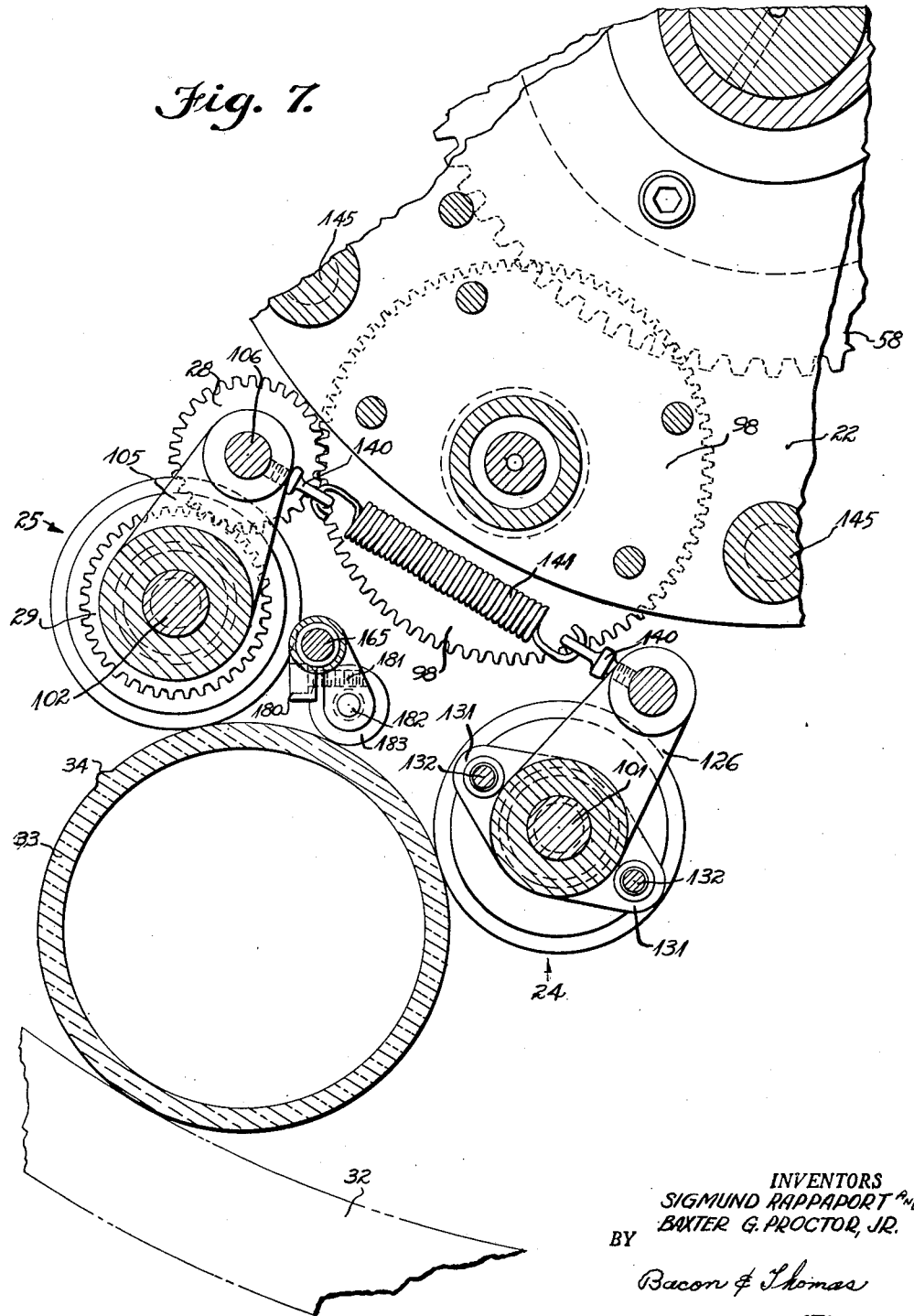

2,528,912

UNITED STATES PATENT OFFICE 2,528,912

SPOTTER MECHANISM

Sigmund Rappaport and Baxter G. Proctor, Jr., Durham, N. C., assignors to Wright Machinery Company, Durham, N. C., a corporation of North Carolina Application May 2, 1949, Serial No. 90,812

23 Claims. (Cl. 198—33)

This invention relates to spotting mechanisms and particularly to mechanisms capable of receiving and positioning articles with predetermined physical characteristics thereof in a desired oriented position. The invention is particularly directed to such spotting mechanisms adapted to handle round articles and to deliver them to a second mechanism for further processing.

In handling articles or products in industry, it often becomes necessary or desirable to perform certain steps or processes on the article at a particular position on the surface thereof with reference to some physical characteristic of the article's surface. An example of such an occasion is in labelling bottled products. Often the bottle, or other container for a product, has some surface characteristic relative to which it is desirable to definitely position a label or the like. It is also often necessary to affix two labels or the like to a round container with such labels diametrically opposed or bearing some other predetermined relative relationship. Another instance in which orientation is necessary is in affixing revenue or other stamps to an article having a label thereon and wherein it is necessary to affix or place the stamp in particular relation to such previously applied label. The above examples are merely illustrative since innumerable situations may arise where it is desirable to orient an article prior to performing some process thereon.

Bottles for packaging many products are obtainable in a form having a continuous and smooth outer surface except for a small projection, adjacent the base of the bottle on a side wall. Such projections may be used as a reference point relative to which any operation, such as label affixing, may be performed and a subsequent label affixing operation performed at a position measured from that projection will always bear the same relationship to the first label affixing step.

In general the mechanism of the present invention comprises a rotatable turret structure having peripheral pockets defined at least in part by friction rollers. The turret mechanism is so positioned relative to an article conveyor that rotation of the turret will position successive pockets to receive articles from the said conveyor. At least one of the rollers is positively driven in rotation about its axis as the turret rotates on its fixed axis to thus impart a spinning motion to the article in the pocket while simultaneously transporting it from the position in which it was received from the conveyor to the discharge position where it is received by a processing machine or the like. Detecting means are provided in position adjacent, or in, the pocket to engage the surface of the article and detect such projections as previously referred to. Upon detection of the projection the means for driving said spinning roller are disengaged therefrom and the roller is positively locked in the position it occupies at that time. Frictional engagement between the article and the locked roller will thus prevent further rotation of the round article while its travel toward the discharge station continues at the same rate. Means are also provided for insuring firm frictional contact between the article and the driving roller at all times. After the article is discharged from the spotting or orienting mechanism a stationary cam engages control elements on the turret to reestablish a driving connection to the article driving roller before it has moved to position to receive another article from the said conveyor.

It is an object of this invention to provide a spotting mechanism rapid in operation, dependable and efficient, and of compact, yet rugged, design.

It is another object of this invention to provide a spotting mechanism capable of being adapted to articles of various sizes or diameters by relatively simple adjustment or parts replacement and capable of accommodating articles of various diameters within a limited range of the diameter for which the mechanism is set.

It is another object of this invention to provide a spotting mechanism in which the article is spun or rotated until proper orientation is reached and in which stopping of the rotation of the article is effected by simultaneously declutching drive to the spinner means and locking the article against rotation.

Another object of the invention is to provide a spotting mechanism adapted to receive and orient articles during their movement through a process and without interrupting the continuous and steady movement of the articles.

It is another object of this invention to provide a spotting mechanism for orienting articles and which is unusually sensitive and rapid in detecting the desired predetermined orientation.

It is a still further object of this invention to provide a spotting mechanism wherein round articles are rotated to the proper position, then stopped and held in that position and wherein the said driving and locking means effect a positive drive and a positive lock.

A still further object of the invention is the provision, in a spotting mechanism, of means to prevent the inertia of rotation of the spinning article from carrying it materially past its desired orientation.

Further objects and advantages will appear as the description proceeds in connection with the accompanying drawings illustrate a preferred embodiment of the invention and wherein:

Fig. 1 is a top plan view of a preferred form of a mechanism embodying the present invention, with its cover plate removed and showing the mechanism in its contemplated relation to a supply conveyor.

Fig. 2 is a front elevational view of the elements defining one pocket of the mechanism with certain details shown in section. Fig. 2 is a view taken substantially from the viewpoint of the line 2—2 of Fig. 1.

Fig. 3 is a substantially radial section through the mechanism taken on the planes indicated by line 3—3 of Fig. 1.

Fig. 4 is a horizontal sectional view of a portion of the spotter mechanism, taken along the line 4—4 of Fig. 3, and showing the elements associated with a single pocket.

Fig. 5 is a horizontal sectional view through the pocket of Fig. 4 but taken along the line 5—5 of Fig. 3.

Fig. 6 is a horizontal sectional view taken substantially along the line 6—6 of Fig. 3.

Fig. 7 is a horizontal sectional view taken substantially along the line 7—7 of Fig. 3.

Fig. 8 is a vertical sectional view taken along the bent line 8—8 of Fig. 6.

Fig. 9 is a fragmentary sectional view taken along the line 9—9 of Fig. 6.

Fig. 10 is a sectional view through a detail of the mechanism and taken substantially along the line 10—10 of Fig. 5.

Figs. 11 and 12 are fragmentary plan views of the clutch-disengaging and roller-locking means.

Referring now to Fig. 1, the spotting mechanism is indicated generally at 20 and comprises a central fixed shaft 21 defining an axis of rotation for the entire spotter mechanism. A carrier plate 22 is mounted on suitable bushings for rotation about the shaft 21 and carries a plurality of radially slidable members 23 on each of which is mounted a pair of friction rollers 24 and 25. A stationary or sun gear 26 is normally held against rotation on the shaft 21 and meshes with planetating gears 27 rotatably mounted on the carrier plate 22. Each of the gears 27 drives a vertical shaft 65. Another gear 98 on shaft 65 (not shown in Fig. 1) is in mesh with movable gear 28 which in turn meshes with gear 29 fixed to the roller 25 of each pair. Driving means (not shown) causes the carrier plate 22 to rotate about the shaft 21 and such movement results in the gears 27 being caused to rotate on their own axes and to drive the rollers 25 in positive rotation.

The entire spotter mechanism is mounted on a suitable stationary support and the rotating turret defined by the mechanism overlies a feed conveyor 30. Suitable guide rails 31 and 32 direct bottles or other round articles 33 toward the spotter mechanism. It is contemplated that a suitable star-wheel or other arrangement be provided to properly space and "time" the articles on the conveyor 30 so that each successive article will reach the periphery of the spotter mechanism in position to move into the "pockets" defined by each pair of rollers 24 and 25 as they move across the conveyor. The guide rail 32 may be curved as shown to extend concentrically about the spotter mechanism and to act as means to hold the articles 33 in the mechanism pockets.

Each of the slidable members 23 is spring-pressed outwardly so that the rollers 24 and 25 will be caused to press against the articles 33 and urge them outwardly into snug contact with the curved rail 32, thus insuring good frictional contact between the rollers and the article. The movable gear 28, referred to above and to be later described in greater detail, provides for continuous positive driving connection to the roller 25 during any radial movement of the slidable member 23.

The ratio of diameters of the gears comprising the gear train from gear 26 to gear 29 are such, and the direction of rotation of the rollers 25 is such, that the articles 33 in the mechanism pockets will be caused to rotate in such direction and at such speed as to "roll" without sliding around the concentric portion of the rail 32.

It is contemplated that articles to be spotted or oriented by the present mechanism be provided with protuberances or projections 34 adjacent their bottom surfaces. Detecting means (not shown in Fig. 1) are arranged between each pair of rollers 24 and 25 to be engaged by the projections 34 on the articles as those projections move past the detecting means by virtue of the rotation of the articles. As the detecting means are moved, a latch or sear is withdrawn from adjacent one end of lever 151 so that spring 157 may swing the lever 151 about its axis 153 and actuate a pawl to disengage a clutch in the chain of driving gears described above and to simultaneously lock certain of said gears against rotation to stop rotation of the articles 33 when the projections 34 have reached the predetermined position of orientation adjacent the detecting means referred to.

Upon cessation of the rotation of the rollers 25 the articles in frictional contact therewith will be moved around the axis of the shaft 21 by virtue of the continued rotation of the turret but in sliding contact with the rails 32. The springs, referred to above, urging the slidable members 23 outwardly, insure sufficient frictional contact between the rollers 24 and 25 and the articles 33 to prevent the articles from rolling against the rail 32.

The rail 32 terminates at 38 adjacent a receiving station of a subsequent machine (not shown) which will have provision for engaging and removing the articles 33 from the pockets of the spotting mechanism. It will be apparent that each article, as it reaches the end 38 of the rail 32, will be oriented with the projection 34 in predetermined position and each succeeding article to reach that station will be similarly oriented. Thus, the subsequent machine will receive the articles in properly oriented position to perform some process thereon.

The sliding members 23 also carry upright posts 40 to the upper ends of which are adjustably attached clamp brackets 41 and steadying means 42. The rollers 24 and 25 will be positioned adjacent the bottom of the mechanism only slightly above the top of the conveyor 30 and a stationary article supporting plate 43. In most instances the articles being oriented will be of substantial height, particularly in the case of bottles, and it is desirable to provide steadying means for the upper ends of such articles. The elements 42 comprise such steadying means and are so proportioned and positioned that their outermost guiding surfaces will lie closely adjacent the surface of the articles 33 at that level. Preferably the steadying means 42 will not be in actual contact with the surface of the article but will be sufficiently close thereto to exert a steadying effect if there is any tendency for the articles to fall inwardly toward the spotting mechanism.

Preferably, the rail 32 will be spaced a substantial distance above the top surface of the conveyor 30 and plate 43 and a second similar rail 32A (see Fig. 3) will be positioned at the same level as the rollers 24 and 25. Such an arrangement of rails is not mandatory and any suitable arrangement may be provided that will produce the desired result.

Referring now to Fig. 3, the elements comprising a single pocket and associated means briefly referred to above, will be described in detail. All pockets are duplicates, so only one need be described in detail. The plate 50 may be any suitable stationary support and is fixed relative to the conveyor 30. A hub member or boss 51 is rigidly attached to the plate 50 and assists in positioning and supporting the central stationary shaft 21 previously referred to. The shaft 21 may be attached to the plate 50 my means of a reduced neck portion and a suitable nut as shown and a set screw 52 may extend through the hub or boss 51 to assist in locking the shaft 21 against rotation. The upper surface of the boss 51 defines a shoulder 53 upon which a suitable bearing element 54 rests. A rotatable bushing or bearing element 55 surrounds the shaft 21 and constitutes a support for a hub member 56. The hub 56 has an outwardly extending central flange 57 to which a gear 58 is suitably attached by means of bolts or otherwise. The carrier plate 22, previously referred to, is also bolted or otherwise fixedly attached to the flange 57 of the hub 56. The gear 58 constitutes the main driving gear for the mechanism and a power-driven pinion (not shown), suitably connected to a source of power and journalled on the plate 50, meshes therewith to impart rotation to the hub 56 and the carrier plate 22.

The carrier plate 22 is provided with a circumferentially spaced series of openings 59, there being one opening for each of the slidable members 23.

A guide member 60 having a rectangular upper portion (see Fig. 6) is provided with an intermediate boss 61 (Fig. 3) and a lower cylindrical boss portion 62. The portions 61 and 62 of the guide 60 are of different diameters, thus defining a shoulder 63 therebetween. The lower portion 62 of the member 60 is of such size as to be received with a "press fit" in the opening 59 of the carrier plate 22. In operation the member 60 is, in effect, an integral portion of the carrier plate 22. The member 60 is further provided with a central vertical bore in which suitable bushings 64 are positioned to rotatably support a vertical shaft 65.

The intermediate portion 61 of the member 60 positions a spacer 66 (see also Fig. 6) of generally circular shape but having a portion at the outer edge thereof cut away as at 66a. The slidable members 23 are provided with open-ended slots 67 (Fig. 6) of such width as to receive the upper rectangular portion of the guide members 60 for free sliding contact but sufficiently snugly to be guided thereby for sliding movement radially of the carrier plate 22. The inner open ends of the slots 67 are closed by a bridge member 68 which also supports an adjustable stop screw 69. A spring 70 bears at one end against the bushing 55 projecting above the hub 56 and at its other end bears against the bridge member 68. As shown, the spring 70 surrounds the inwardly projecting portion of the adjustable stop screw 69. The spring 70 constantly urges the slidable member 23 radially outwardly of the carrier plate 22 and the screw 69 will limit the outward movement of the member 23 when its end engages the innermost end of the guide member 60. The spacer 66, referred to above, extends laterally of the guide member 60 a considerable distance and constitutes a support over which the slide member 23 slides in its radial movement. The upper rectangular portion of the guide member 60 is of at least the same thickness as the slide 23 and has its upper surface practically coextensive with the upper surface of the said slide 23 or slightly thereabove. Cross members or gibs 71 are attached to the top surface of the guide member 60 and extend laterally therebeyond to overlie the top surface of the slide 23 and effectively confine the slide to radial movement without tilting. The members 71 also prevent vertical displacement of the slides 23 relative to the guide 60.

Referring again to Fig. 3, a locking collar 72 surrounds the shaft 65 and engages the upper surface of the guide member 60 to prevent downward axial displacement of the shaft 65. The collar 72 is fixed to the shaft 65 by means of suitable set screws or the like. The collar 72 also acts as a support for the outer race 73 of a clutch to be described.

The outer race 73 is journalled on the shaft 65 by means of a suitable bushing 74 and may rotate freely thereon. The gear 27 is keyed to a hub portion of the outer race 73 and is the gear 27 referred to in connection with Fig. 1 that was described as being in mesh with fixed gear 26. It will be apparent that rotation of the carrier plate 22 about the shaft 21 will result in rotation of the gear 27 about the axis of the shaft 65.

As shown in Fig. 3 the bushing 55 on shaft 21 is surmounted by a spacing collar 74a which in turn supports a central member 75 suitably keyed to the shaft 21, as at 76, and having an outwardly extending flange 77 at its lowermost end and external threads 78 at the top thereof. The flange 77 supports a friction disc 79 in engagement with a downwardly facing surface of a recess 80 in the central portion of the gear 26.

A friction plate 81 overlies the upper surface of the gear 26 and is in frictional contact therewith. An adjustable nut 82 is provided with internal screw threads engaging the threads 78 of the member 75 whereby it may be axially positioned in spaced relation to the friction disc 81. The adjusting nut 82 is provided with a series of recesses 83 facing similar recesses 84 in the friction disc 81. Compression springs 85 have their ends positioned in the opposed recesses 83 and 84 and a locking pin or key 86, carried by the nut 82, extends into an opening 87 in the friction disc 81 to lock the friction disc and adjustable nut against relative rotation. The springs 85 exert pressure on the friction disc 81 to clamp the gear 26 between the said friction disc 81 and the friction disc 79 previously described. The frictional gripping of the gear 26 is sufficient to prevent rotation of the gear 26 relative to central member 75 and shaft 21 during normal operation of the mechanism but provides a safety feature whereby "jamming" of any of the gear trains to the rollers 25 will permit the gear 26 to turn relative to the shaft 21 without stripping any of the gears of the said trains or otherwise damaging the mechanism. A suitable lock nut 88 is threaded to the central member 75 and is adapted to jam against the adjustable nut 82 to lock it in position on the central member 75.

The outer race 73, previously referred to, is provided with a central recess or opening 89 (see also Fig. 5) surrounding and containing an inner race 90 keyed to the shaft 65. The outer surface of the inner race 90 is spaced inwardly of the inner surface of the recess 89 and is provided with flat or cam surfaces 91 between which, and the inner surface of the recess 89, rollers 92 are positioned. A cage member 93 has an annular portion extending downwardly into the space between the inner and outer races and is provided with suitable openings or slots to receive the rollers 92 and confine them to positions adjacent their respective flat surfaces 91. The clutch construction described, including the elements 73, 90, 92 and 93 are conventional and of standard construction. They may be obtained on the open market as an assembled unit so need not be described in greater detail. Spring means (not shown) bias the cage 93 for rotation relative to the inner race 90 so as to position the rollers 92 to effect driving of the inner race 90 by rotation of the outer race 73. This feature is also a feature of the commercially obtainable clutch.

A gear 94 is fixed to the cage 93, concentrically about the axis of shaft 65, and extends radially outwardly beyond the outermost surface of the outer race 73. A suitable collar 95 is keyed to the shaft 65 above the cage 93 and has ratchet wheel 96 affixed thereto to be held against rotation relative to the shaft 65. The ratchet wheel 96 and the gear 94 are of about the same outer and root diameters and lie relatively closely adjacent each other, being only slightly spaced apart in a vertical direction. Fig. 11 shows a fragmentary portion of the ratchet wheel 96 and the gear 94 in the relative positions they assume when the clutch is conditioned (its normal condition) for transmitting driving torque therethrough. As is evident from Fig. 11, the gear 94 is provided with conventional gear teeth whereas the ratchet disc or wheel 96 is provided with conventional ratchet or buttress teeth at its periphery. The gear 94 and the wheel 96 are provided with the same number of teeth. When the clutch is in driving condition the teeth of the ratchet wheel 96 are out-of-registry with the teeth of the gear 94, all as clearly shown in Fig. 11. Further reference will be made hereafter to these elements.

Returning to Fig. 3, the shaft 65 is provided with a head or flange 97 at its lower end to which a gear 98 is suitably affixed by means of screws or otherwise. The gear 98 abuts the lowermost end of the guide member 60 and constitutes a holding means to prevent vertical displacement of the shaft 65 in an upward direction relative to the guide member 60 and carrier plate 22. The collar 72, previously described, prevents downward movement of the shaft 65 relative to the guide member 60. From the structure thus far described, and with the roller clutch in operative condition, rotation of the plate 22 about the shaft 21 will result in the gear 27 planetating around the gear 26 thus causing the outer race 73 and the inner race 90, along with shaft 65 and gear 98, to rotate in the same direction.

Referring now to Fig. 6, the slide 23 is shown as being provided at its outermost "corner" portions with openings 100 in which pins or shafts 101 and 102 are positioned. The shaft 102 extends downwardly from the slide member 23 and is provided with a flange 103 and a bearing portion 104 (see Fig. 8). The bearing portion 104 rotatably mounts a bracket 105 which extends inwardly toward the gear 98 and the spacer 66 previously referred to. The free end of the bracket 105 is provided with a vertically extending stub shaft 106 which projects both above and below the said free end of the bracket 105. A roller 107 is journalled on the stub shaft 106 above the bracket 105 and lies substantially in the plane of the spacer 66. The downwardly projecting end of the stub shaft 106 mounts a suitable anti-friction bearing 108 which rotatably mounts the idler or movable gear 28, described in connection with Fig. 1. The gear 28 is in mesh with the gear 98 on the lower end of the shaft 65 and also meshes with gear 29. The gear 29 is rotatably mounted on a downwardly projecting neck 109 of the shaft 102 by means of suitable anti-friction bearings 110. The gear 29 also has a downwardly extending cylindrical portion 111 providing a support for retaining ring 112 and a friction ring or roller 113. The friction ring 113 may be of rubber or other similar material having a high coefficient of friction and constitutes the article-contacting element of the friction roller 25. A nut 114 threaded to the lowermost end of the cylindrical portion 111 serves to retain the retainer 112 and the friction ring 113 in assembled and fixed relation to the gear 29. A nut or the like 115 screwed to the lowermost end of the shaft 102 to retain the anti-friction bearings 110 in position on the shaft.

The shaft 101 at the opposite side of the slide 23 (Figs. 6, 7 and 9) is of a construction similar to the shaft 102 and is mounted to the slide member 23 in the same manner. The friction roller 24 is rotatably mounted on the shaft 101 by suitable anti-friction bearings 120, retained in position by a nut 121 or the like. The roller 24 comprises a central tubular member 122 rotatably supported by the bearings 120 and having a threaded lower end to receive a nut 123. The nut 123 holds a friction ring 124 and retainer 125 in assembled relation to the member 122 by compressing the said retainer and friction ring between the nut 123 and a shoulder 122a on the cylindrical member 122. The ring 124 may also be of rubber or other suitable material having a high coefficient of friction. The shaft 101 is provided with a bearing portion immediately above the roller 24 similar to the bearing portion 104 of the shaft 102 and supports a bracket 126 for rotation thereabout. The bracket 126 extends inwardly as does the bracket 105 and carries a roller 127 on an upwardly extending pin 128. The roller 127 also lies in the same plane as the spacer member 66.

Referring now to Fig. 2, the lower right hand portion of which shows the mounting for the roller 24 in partial section, the retainer 125 is provided with an outwardly extending flange portion overlying the friction ring 124 and having an upwardly facing surface upon which a friction ring or brake shoe 130 is positioned. The bracket 126 has opposed outwardly extending ears 131 (see also Fig. 7) carrying downwardly extending pins 132. The pins 132 are frictionally retained in openings in the ears 131 and extend downwardly into diametrically opposed openings 133 in the brake element 130.

The pins 132 fit the openings 133 rather loosely and springs 134 abut against the ears 131 and the brake shoe 130 to urge the brake shoe downwardly in frictional contact with the retainer 125. It will be apparent that the roller 24 is free to rotate about the axis of its supporting shaft 101 but such rotation is resisted by the brake shoe 130 which is held against rotation by the pins 132. The purpose for this structure will be described later.

As stated previously, the rearwardly extending brackets 105 and 126 (see Figs. 6 and 7) are freely rotatable on the shafts 102 and 101, respectively. Adjacent its innermost end each of the brackets 105 and 126 is provided with a suitable eyelet 140 engaged by an end of a common tension spring 141. The tension spring 141 urges the inner ends of the brackets toward each other so that the axes of the rollers carried by those brackets moved toward the line poining the axis of the gear 98 and the axis upon which the bracket rotates. Each of the rollers 107 and 127 will be moved under the influence of the spring 141 into rolling contact with the cylindrical peripheral portion of the spacer 66. Thus, the bracket 126 will be held against substantial rotation about its axis even when the slide 23 upon which it is mounted moves radially of the carrier plate 22, at which time the roller 127 will merely roll around the periphery of the spacer 66 a short distance. The bracket 126 is thus effective to hold the brake shoe 130 substantially stationary at all times. In like manner the roller 107 carried by the bracket 105 will be held constantly in engagement with the peripheral surface of the spacer 66. The radius of the circular portion of the spacer 66 plus the radius of the roller 107 is equal to the sum of the pitch radii of the gears 28 and 98. The roller 107 thus acts to maintain the pitch circles of the gears 28 and 98 tangent at all times and prevent "jamming" of their teeth even though the spring 141 urges the gear 28 radially inwardly of the gear 98. By this arrangement the slide 23 and gear 29 are permitted to move radially of the carrier plate 22 relative to the gear 98 while maintaining effective and proper mesh between the gears 28, 29 and 98. The spacing between the axes of the shafts 102 and 106 are equal to the sum of the pitch radii of the gears 28 and 29 so that the pitch circles of those two gears are always maintained in a tangent relationship as the bracket 105 swings about the shaft 102.

Referring now to Fig. 4, a vertical stud 145, mounted on the carrier plate 22 between adjacent slides 23 supports a pawl arm 146 for rotation. The pawl arm 146 is provided with a pawl element 147 complementary in shape to the teeth of the ratchet wheel 96 previously described and also carries a pawl element 148 of generally wedge or rack tooth shape. The pawl element 148 is of such shape that it will snugly enter the space between the peripheral teeth on the gear 94. Since the gear 94, fixed to the cage 93 of the roller clutch, is axially spaced below the ratchet wheel 96, the pawl element 148 is spaced an equal distance below the upper portion of the pawl element 147 and each of the pawl elements 147 and 148 have portions lying in the same planes as the ratchet wheel 96 and gear 94, respectively. The pawl arm 146 is swingable from the position shown in Fig. 4 inwardly about the axis of 145 toward the ratchet and gear referred to to engage the pawl elements 147 and 148 in the grooves or spaces between the teeth, as shown in Fig. 12. The lateral relative spacing between pawl elements 147 and 148 is such that the pawl elements will not enter the spaces between the teeth of wheels 94 and 96 without imparting relative rotation to those wheels from the position of Fig. 11 to the relative position shown in Fig. 12, all as will be clearly apparent from the drawings. Relative rotation of the wheels 94 and 96 from the position of Fig. 11 to that of Fig. 12 results in relative rotation between the inner race 90 and the cage 93 of the roller clutch previously described. Such relative rotation will so move the rollers 92 relative to the surfaces 91 (see Fig. 5) that the driving connection from the race 73 to the inner race 90 is broken and continued rotation of the outer race 73 will be inoperative to drive the inner race and shaft 65 to which it is keyed.

When the pawl arm 146 moves to the position shown in Fig. 12 the pawl elements 147 and 148 will positively lock the wheels 94 and 96 against rotation and since the wheel 96 is rigid with the shaft 65, the train of gears 28, 29 and 98 will be positively locked and effective to positively lock the roller 25 against rotation.

The pawl arm 146 has a slot 150 (Fig. 4) extending outwardly through its radially outermost end. A lever 151 (see also Fig. 5) is pivoted to the slide 23 about the axis of the shaft 101 which supports the roller 24 (see also Fig. 9). A cap threaded to the uppermost end of the shaft 101 clamps that shaft to the slide 23 and has an upward extension 153 supporting a bushing 154 upon which the lever 151 is mounted. The extension 153 provides a relatively long bearing surface for the bushing 154 and lever 151. The lever 151 is provided with an upwardly extending roller 155 mounted thereto by a suitable bolt 156. The roller 155 is of a diameter only slightly less than the width of the groove or slot 150 of the pawl arm 146 and constitutes a driving connection between the lever 151 and the pawl arm 146. The lever 151 is biased by a tension spring 157, having one end attached to the lever and the other end attached to the slide 23, in a direction to swing the pawl arm 146 to project the pawl elements 147 and 148 into the wheels 96 and 94. As shown in Fig. 4, the axis about which the lever 151 rotates is so positioned relative to the roller 155 and the direction of the slot 150 that a multiplication of force is attained. The force of the spring 157 is multipled as applied to the lever 146 since the roller 156 moves in a direction having its major component parallel to the sides of the slot 150. Movement of a relatively small magnitude of the pawl elements 147 and 148 will be sufficient, whereas the end of the lever 151 to which spring 157 is attached may move through a considerable distance in driving the pawl arm 146. Thus the spring 157 will be able to project the pawl elements into the ratchet and gear wheels and exert sufficient force to effect relative rotation of those wheels and to hold them in positively locked position.

As shown in Fig. 5, the lever 151 has an elongated portion 160 extending generally toward the roller 25 and is provided with an end surface 161 and a radial surface 162. A pivoted latch or sear 163 normally held by tension spring 164 in position to engage the surface 162 of the lever 151 to prevent the spring 157 from projecting the pawl elements into the ratchet and gear wheels referred to. The sear 163 is adjustably carried on the uppermost end of a shaft 165 (see also Fig. 10). The slide 23 is provided with an opening 166 through which a tubular bracket 167 extends. The bracket 167 is provided with suitable ears 168 by which it is rigidly attached to the slide 23, all as clearly shown in Fig. 10. Bushings 170, within the tubular bracket 167, rotatably support the shaft 165. A stop collar 171 is adjustably clamped, adjacent the upper end of the shaft 165, to a hub portion 172 of the sear 163. The stop collar 171 is provided with an outwardly extending finger 173 (see Fig. 5) engageable with a stop pin 174 extending upwardly from an ear 168 of the bracket 167. A set screw 175 assists in clamping the sear 163 to the shaft 165 and is provided with an opening at its outer end to receive one end of the spring 164. The other end of spring 164 is attached to the slide 23 by a suitable eyelet element 176. The spring 164 constantly urges the sear 163 and the finger 173 in a clockwise direction as viewed in Fig. 5 but the stop pin 174 limits that movement to such an extent that the end surface of the sear 163 moves into position to just engage the surface 162 of the lever 151 only slightly inwardly of the end surface 161.

The lowermost end of the shaft 165 has a split bracket 180 clamped thereto as by screw 181 (Fig. 7). The bracket 180 (see Figs. 7 and 10) carries a pin 182 eccentric to the shaft 165 and upon which a roller 183 is rotatably mounted. With the sear parts in the position shown in Fig. 5 the roller 183 will be so positioned that its outer surface lies closely adjacent the outer surface of an article 33 in the pocket defined by the rollers 24 and 25. Since the sear 163, the finger 173 and the bracket 180 are angularly adjustable about the shaft 165, it is apparent that the elements may be so adjusted as to position the roller 183 in any desired position radially of the spotting mechanism, within limits, to lie closely adjacent the surfaces of round articles of different diameters.

As the article 33, shown in Fig. 5, is rotated in a clockwise direction by movement of the spotting mechanism to the right and under the influence of rotation of roller 25, the projection 34 will progress past the roller 25 and in position to engage the detector roller 183. Since the roller 183 normally lies closely adjacent the surface of the article 33, movement of the projection 34 therepast will force the roller 183 inwardly, thus imparting a counter-clockwise rotation to the sear 163 and withdrawal of the sear past the surface 161 of lever 151 permitting spring 157 to swing lever 151 counter-clockwise. As the lever 151 swings counter-clockwise as described, the roller 155 carried thereby and engaging in the slot 150 of the pawl arm 146 will cause the pawl arm to swing clockwise, as seen in Fig. 4, sufficiently to project the pawl elements 147 and 148 into the teeth of the wheels 94 and 96. Such projection of the pawl elements into the said wheels will impart a relative rotation to the wheels 94 and 96 from the positions shown in Fig. 11 to that shown in Fig. 12. This relative rotation causes the cage 93 (Fig. 5) to move the rollers 92 to clutch-disengaging position, thus rendering the drive to the roller 25 inoperative and at the same time positively locking the ratchet wheel 96 against rotation which, in turn, positively locks the roller 25 against rotation.

Since the roller 25 has been locked against rotation and its surface has a high coefficient of friction against the surface of the article 33, rotation of the article will be stopped. The spring 70 urging the slide 23 outwardly maintains firm pressure contact between the rollers 24 and 25 and the article 33 to thus insure a good "grip" on the article 33 while forcing it against the rail 32. Continued movement of the carrier plates 22 in a counter-clockwise direction will cause the article 33 to slide around against the rail 32 without rotating on its own axis. Such sliding movement takes place with the projection 34 of each succeeding article in the same position relative to the detector roller 183 so that all articles are carried to the discharge station, at the end 38 of the rail 32, in the same position of orientation. At that position a machine positioned to subsequently operate on the articles may grip or otherwise engage the articles and remove them from the spotting mechanism described herein. Such subsequent machines form no part of the present invention and are not shown or described.

After removal of properly oriented articles from the spotting mechanism it is necessary to restore the driving mechanism for the roller 25 to operative condition. To accomplish this purpose a bell crank lever 200 is pivoted at an intermediate point to the vertical shaft 145 upon which the pawl arm 146 is pivotally mounted (see Fig. 4). The bell crank 200 and the pawl arm 146 are pivotally mounted on the shaft 145 for independent pivotal movement. The bell crank 200 has an outwardly extending portion provided with an open-ended slot 201 extending parallel to the slot 150 in the pawl arm 146. The slot 201 of the bell crank embraces a pin 203 extending upwardly from the lever 151 and carried thereby in a position eccentric to the axis of its pivotal support 153. The previously described swinging of the lever 151 by spring 157 will cause the bell crank 200 to swing about its pivot to follow movements of the pin 203 and since the lever 151 moves counter-clockwise as seen in Fig. 4 under influence of the spring 157, the bell crank 200 will be rotated clockwise to project its innermost end 204 radially inwardly of the spotting mechanism. The innermost end 204 of the bell crank 200 carries a roller 205 freely rotatable thereon and lying substantially coplanar with the peripheral edge of a cam 206 rigidly fixed to the central shaft 21 upon which the spotting mechanism is mounted. As shown best in Fig. 1, the cam 206 is provided with an outer track portion 207 of substantially uniform radius and a second or clearance portion 208 of considerably lesser radius than the portion 207. Suitable roller-engaging surfaces join the portions 208 and 207. As also clearly evident from Fig. 1, the rollers 205 will engage the "riser" portion 209 of the cam 206 immediately after removal of the article 33 from the spotting mechanism. As the roller 205 engages the riser 209, the bell crank 200 is caused to rotate in a counter-clockwise direction on its pivotal mounting until the roller 205 reaches the portion 207 of the cam. Such counter-clockwise movement of the bell crank 200 will impart a clockwise rotation to the lever 151, through pin 203 in slot 201, to project the end portion 160 of the lever 151 radially inwardly sufficiently for the surface 162 to clear the end of the sear 163. As the end 160 and surface 162 of the lever 151 clear the end of the sear 163, spring 164 will rotate the sear 163 clockwise until the finger 173 engages stop in 174, all as previously described, and position detector roller 183 for a new cycle of operation. When the lever 151 is rotated clockwise as described, the roller 155 carried thereby will also withdraw the pawl elements 147 and 148 from the wheels 94 and 96.

Such withdrawal of the pawl elements from the wheels will release those wheels to the clutch resetting spring (previously mentioned, but not shown) to reset the roller clutch to restore driving relationship from the gear 26 to the roller 25.

After the rollers and associated mechanisms defining a single "pocket" of the mechanism have progressed past the receiving station and an article from the conveyor 30 is positioned in the pocket, continued rotation of the spotting mechanism in a counter-clockwise direction will cause the roller 205 to pass off the end of the portion 207 of cam 206 to lie outwardly of the clearance portion 208. No great magnitude of movement of the roller 205 occurs at this time since the lever 151 will rotate counter-clockwise only sufficiently to bring the surface 162 against the end face of the sear 163, as shown in Fig. 5. Further movement of the lever 151, and consequently bell crank 200, is arrested at this point and continued movement of the spotting mechanism counter-clockwise will produce the detecting and spotting or orienting operation of the article 33 as previously described. The cam 206 is so proportioned that rollers 205 pass off the high part 207 of the cam at about the same time an article enters a pocket. When the projection 34 of the article trips the sear 163 and releases the lever 151 to the action of the spring 157 the bell crank 200 will be caused to move clockwise and project its roller 205 radially inwardly of the cam 206, substantially to the position shown in the lower right hand portion of Fig. 1. This innermost position of the roller 205 is still outwardly of the low portion 208 of the cam 206 but is radially inwardly of the high portion 207 of that cam so the roller will be in position to engage the riser 209 after the article 33 has been removed from the mechanism.

A suitable split clamp member 210 is arranged to grip and compress a split hub 211 of the cam 206 (Figs. 1 and 3) to frictionally lock the cam 206 to the shaft 21 whereby it may be angularly adjusted when occasion demands.

It is contemplated that a protective cover 215 (see Fig. 3) be arranged over the mechanisms described during operation to protect the said mechanisms against accidental damage from foreign matter or objects likely to fall thereon. The cover member 215 is preferably a large disc-like element clamped to the upper ends of posts 220 extending upwardly from the rotatable carrier plate 22 from spaced peripheral positions between adjacent slides 23.

The friction brake connection, previously referred to, between friction roller 24 and bracket 126 performs two principal functions. First, it assists in stopping rotation of an article when the driving roller 25 stops, by absorbing some of the kinetic energy of rotation of the article, to insure stopping rotation of the article immediately after the projection 34 passes the detector roller 183. Second, the roller 24 partially resists the rotation of an article being driven by roller 25. This resistance causes the article 33 to tend to "roll" inwardly on the roller 24, thus causing the article to press more firmly against driving roller 25 and maintain firm contact therewith.

It will be apparent that angular adjustment of the bracket 180 about the shaft 165 and/or angular adjustment of the sear 163 and/or finger 173 about the shaft will condition the mechanism to handle articles of different nominal diameter. Having set the mechanism for articles of a given size, the slide 23, being radially slidable, provides for accommodation of articles varying slightly from that nominal size. Preferably, the stop bolt 69 will be set to engage the end of guide 60 when the space between the rollers 24 and 25 and the rail 32 is just sufficient to receive an article of minimum size. Articles of greater than minimum size will cause the slide 23 to slide inwardly and compress spring 70. Such radial movement of slide 23 will not affect the position of lever 151, pawl arm 146, or reset bell crank 200 since the pin 203 and roller 155 are free to move, with slide 23, along slots 201 and 150, respectively. The slots 150 and 201 are arranged to lie parallel to the direction of movement of the slide 23 as long as the roller 25 is being driven.

Although a single preferred embodiment of the spotting mechanism has been shown and described, it is apparent that many changes and modifications may be made therein without departing from the scope of the invention. It is intended that the invention be limited, not by the illustrations and description, but by the appended claims only.

We claim:

1. In a spotting mechanism for round articles, a support having means defining an axis, a carrier mounted for rotation about said axis, a pair of spaced parallel rollers rotatably mounted on said carrier, driving means for rotating one of said rollers in response to rotation of said carrier about said axis, said rollers defining a peripheral pocket to receive a round article, and means engageable with an article to hold the same in said pocket and against said rollers.

2. In a spotting mechanism for round articles, a support having means defining an axis, a carrier mounted for rotation about said axis, a pair of spaced parallel rollers rotatably mounted on said carrier, driving means for rotating one of said rollers in response to rotation of said carrier about said axis, said rollers defining a peripheral pocket to receive a round article, and means engageable with an article to hold the same in said pocket and against said rollers, movable detecting means on said carrier in position to engage and be moved by a surface undulation of said round article and means operable upon movement of said detecting means to render said driving means inoperative to rotate said roller.

3. A mechanism as defined in claim 2, wherein said rollers are carried by a member slidable radially of said carrier.

4. In a spotting mechanism for round articles, a support having means defining an axis, a carrier mounted for rotation about said axis, a pair of spaced parallel rollers rotatably mounted on said carrier, a first gear fixed on said support concentric to said axis, a second gear rotatably mounted on said carrier in mesh with said first gear, and driving means between said second gear and one of said rollers, said rollers defining a peripheral pocket to receive a round article, and means engageable with an article to hold the same in said pocket and against said rollers.

5. In a spotting mechanism for round articles, a support having means defining an axis, a carrier mounted for rotation about said axis, a slide carried by said carrier for radial sliding movement thereon, a pair of spaced parallel friction rollers rotatably carried by said slide, means normally urging said slide radially outwardly of said carrier, a first gear rotatably mounted on said carrier, a second gear fixed relative to one of said rollers, a third gear in mesh with said first and second gears, said third gear being movable toward and from a line joining the axes of said first and second gears, and means normally urging said third gear toward said line.

6. A mechanism as defined in claim 5, wherein said third gear is rotatably carried by an arm pivoted to said slide.

7. A mechanism as defined in claim 5, wherein said third gear is rotatably carried by an arm pivoted to said slide about the axis of said second gear and roller.

8. A spotting mechanism as defined in claim 5, wherein said third gear is rotatably carried by an arm pivoted to said slide about the axis of said second gear and roller, a guide surface adjacent said first gear and concentric to said first gear axis, and means carried by said pivoted arm and engageable with said guide surface when the pitch circles of said first and third gears are tangent.

9. A spotting mechanism defined in claim 8, wherein said last-named means comprises a roller coaxial with said third gear.

10. In a spotting mechanism for round articles, a support having means defining an axis, a carrier mounted for rotation about said axis, a pair of spaced parallel rollers rotatably mounted on said carrier, driving means for rotating one of said rollers when said carrier rotates about said axis, said rollers defining a peripheral pocket to receive a round article, and means engageable with an article to hold the same in said pocket and against said rollers, and friction brake means engageable with the other of said rollers to yieldably resist rotation thereof.

11. A mechanism as defined in claim 1, wherein said last-named means comprises a fixed rail concentric to said axis and wherein said driving means are arranged to drive said roller in such direction and at such speed relative to the direction and speed of said carrier that a round article in said pocket will "roll" against said fixed rail.

12. In a spotting mechanism for round articles, a support having means defining an axis, a carrier mounted for rotating about said axis, a pair of spaced parallel rollers rotatably mounted on said carrier, driving means for rotating one of said rollers when said carrier rotates about said axis, said rollers defining a peripheral pocket to receive a round article, and means engageable with an article to hold the same in said pocket and against said rollers, movable detecting means on said carrier in position to engage and be moved by a surface undulation of said round article, and means operable upon movement of said detecting means to render said driving means inoperative to rotate said roller, said driving means comprising a clutch and a toothed wheel between said clutch and roller, said means operable upon movement of said detecting means to disengage said clutch and lock said toothed wheel and said one roller against rotation.

13. In a spotting mechanism for round articles, a support having means defining an axis, a carrier mounted for rotation about said axis, a pair of spaced parallel rollers rotatably mounted on said carrier, driving means for rotating one of said rollers when said carrier rotates about said axis, said rollers defining a peripheral pocket to receive a round article, and means engageable with an article to hold the same in said pocket and against said rollers, movable detecting means on said carrier in position to engage and be moved by a surface undulation of said round article, and means operable upon movement of said detecting means to render said driving means inoperative to rotate said roller, said driving means comprising a clutch and a toothed wheel driven thereby, said toothed wheel being in positive driving relation to said one roller, a movable pawl, and means operable upon movement of said detecting means to disengage said clutch and move said pawl against said toothed wheel to lock said one roller against rotation.

14. In a spotting mechanism for round articles, a plurality of spaced rollers defining an open-sided pocket, driving means for rotating one of said rollers on its axis, means engageable with a round article in said pocket to hold the same against said rollers, and friction brake means between another of said rollers and its support to resist rotation of said roller.

15. In a spotting mechanism for round articles, a plurality of spaced rollers defining an open-sided pocket, driving means for rotating one of said rollers on its axis, means engageable with a round article in said pocket to hold the same against said rollers, movable detecting means in position to engage and be moved by a surface undulation of an article being rotated in said pocket, said driving means comprising a clutch having parts relatively rotatable to engage and disengage the same, one of said parts being in positive driving relation to said one of said rollers, said parts comprising concentric toothed wheels, means normally urging said parts in relative rotation in a direction to engage said clutch, pawl means under the control of said detecting means, said pawl means including relatively fixed pawl elements movable into engagement with said toothed wheels to substantially simultaneously rotate said wheels relative to each other to disengage said clutch and to lock said one of said parts against rotation.

16. A mechanism as defined in claim 15, wherein said pawl means are normally urged into engagement with said toothed wheels, latch means to retain said pawl means in retracted position, said latch means being movable by said detecting means.

17. A mechanism as defined in claim 15, wherein said pawl means are carried by a first pivoted arm, a pivoted lever, a driving connection between said arm and lever comprising an eccentric pin on said lever engaging a generally radial slot in said arm, resilient means urging said lever in a direction to project said pawl means against said toothed wheels, and a latch to retain said lever in retracted position, said latch being movable by said detecting means.

18. A mechanism as defined in claim 17, including resetting means to move said lever into retracted position behind said latch.

19. A mechanism as defined in claim 15, including a rotatable carrier and wherein said rollers are mounted on said rotatable carrier and further including reset means to retract said pawl means from said toothed wheels, said reset means comprising an element carried by said rotatable carrier and engageable with a non-rotatable cam.

20. In a spotting mechanism for round articles, a support having means defining an axis, a carrier mounted for rotation about said axis, a slide carried by said carrier for radial sliding movement thereon, a pair of spaced parallel friction rollers rotatably carried by said slide, means normally urging said slide radially outwardly of said carrier, driving means on said carrier for rotating one of said rollers as said carrier rotates on said axis, detecting means on said slide in position to detect surface undulations of said round article, a first means on said slide and movable thereon in response to operation of said detecting means, a second means carried by said carrier for movement thereon to render said driving means inoperative to drive said roller, said first and second means engaging each other in sliding contact along a surface to transmit movement of said first means laterally of said surface to said second means to effect rendering said drive means inoperative, said surface extending parallel to the direction of movement of said slide on said carrier.

21. A mechanism as defined in claim 20, wherein said first and second means comprise levers pivoted to said slide and carrier, respectively, and wherein a projection on the lever on said slide engages a slot in the other lever, the said slot extending parallel to the direction of movement of the slide on the said carrier.

22. A mechanism as defined in claim 20, further including a resetting means movably carried by said carrier and engageable with said first means to transmit movement thereto to restore said driving means to operative conditions, said resetting means engaging said first means along a surface extending parallel to the direction of movement of said slide on said carrier.

23. In a spotting mechanism for round articles, a support, a slide movable on said support, orienting means carried by said slide to engage a round article and rotate it to bring a physical characteristic thereof to a predetermined position, driving means extending from said support to said orienting means, means responsive to arrival of said characteristic at said predetermined position to effect movement of an element on said slide in a direction transverse to the movement of said slide on said support, a member movable on said support and engageable with said element along a surface extending parallel to the direction of movement of said slide on said support, said member being movable by said movement of said element to render said driving means inoperative.

SIGMUND RAPPAPORT.
BAXTER G. PROCTOR, Jr.

REFERENCES CITED

The following references are of record in the file of this patent:

UNITED STATES PATENTS

| Number | Name | Date |
|---|---|---|
| 1,743,018 | Magnusson | Jan. 7, 1930 |
| 2,109,505 | Rue | Mar. 1, 1938 |
| 2,222,503 | Essen | Nov. 19, 1940 |
| 2,222,504 | Essen | Nov. 19, 1940 |
| 2,293,553 | Magnusson | Aug. 18, 1942 |
| 2,426,433 | Carter | Aug. 26, 1947 |